United States Patent [19]

Wicks et al.

[11] Patent Number: 5,926,108
[45] Date of Patent: Jul. 20, 1999

[54] MOVIE INFORMATION PAGER

[75] Inventors: James E. Wicks, San Francisco, Calif.; Eduardo Sciammarella, Hoboken, N.J.

[73] Assignees: Sony Corporation, Tokyo, Japan; Sony Electronics, Inc., Park Ridge, N.J.

[21] Appl. No.: 08/799,183

[22] Filed: Feb. 12, 1997

[51] Int. Cl.[6] .................................................. H04B 7/00

[52] U.S. Cl. .............................. 340/825.44; 340/825.47; 455/31.3; 395/200.49

[58] Field of Search ..................... 340/825.44, 825.47; 395/200.49; 455/31.3

[56] References Cited

U.S. PATENT DOCUMENTS

| | | | |
|---|---|---|---|
| 4,415,065 | 11/1983 | Sandstedt | 340/825.44 |
| 4,951,039 | 8/1990 | Schwendeman et al. | 340/825.44 |
| 5,173,688 | 12/1992 | DeLuca et al. | 340/825.44 |
| 5,331,431 | 7/1994 | Jasinski | 358/462 |
| 5,446,678 | 8/1995 | Saltzstein et al. | 395/200.76 |
| 5,452,356 | 9/1995 | Albert | 340/825.44 |
| 5,481,255 | 1/1996 | Albert et al. | 340/825.44 |
| 5,491,785 | 2/1996 | Robson et al. | 455/38.4 |
| 5,495,344 | 2/1996 | Callaway, Jr et al. | 455/38.4 |
| 5,508,695 | 4/1996 | Nelson et al. | 340/825.44 |
| 5,535,428 | 7/1996 | King et al. | 340/825.44 |
| 5,539,395 | 7/1996 | Buss et al. | 340/825.44 |
| 5,555,446 | 9/1996 | Jasinski | 340/825.44 |
| 5,594,661 | 1/1997 | Bruner et al. | 395/200.49 |
| 5,649,289 | 7/1997 | Wang et al. | 455/31.3 |
| 5,703,571 | 12/1997 | Cannon et al. | 340/825.44 |

*Primary Examiner*—Brian Zimmerman
*Assistant Examiner*—Yves Dalencourt
*Attorney, Agent, or Firm*—Ronald P. Kananen; Rader, Fishman & Grauer

[57] ABSTRACT

A pager and two-way paging system may be provided which allow the pager user to send a request for movie information. The system identifies the general location of the pager user; compiles theater location, movie and show time information appropriate to the pager user's location; and transmits the information to the pager user. In a more sophisticated system, the pager user may be able to select a theater, movie and show time and transmit the selection from the pager to the paging system. The service provider of the paging system then arranges for tickets to that movie to be purchased in advance for the pager user.

10 Claims, 4 Drawing Sheets

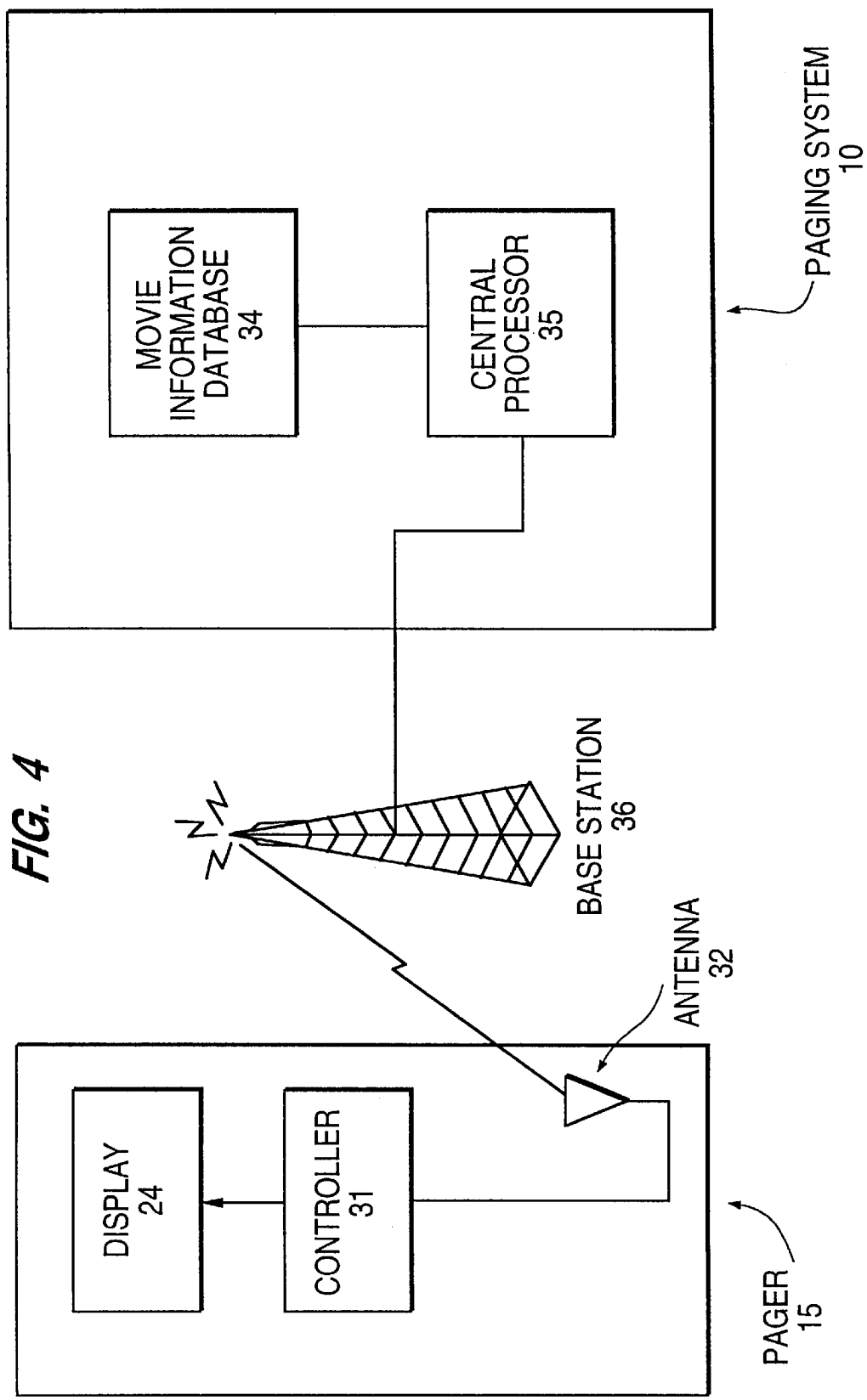

MOVIE INFORMATION PAGER

FIELD OF THE INVENTION

The present invention relates generally to the field of wireless pagers. More particularly, the present invention relates to the application of wireless pager technology to theater information and ticket sales.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they may be reached at a given time.

In general, the user of a pager purchases the unit and enters into a contact with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but may have the capability to transmit an answer back to the system. This is referred to as two-way paging.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate. This is particularly true of the developing two-way pager systems. Accordingly, there is a need for improved methods and applications of pager technology to meet the information and communication demands of pager users.

Movies theaters are also of great popularity in modern society. Theaters with a multitude of screens showing a wide variety of movies throughout the day and evening are now common. However, it can be extremely burdensome to locate a movie theater with an interesting or acceptable movie showing at a convenient time if one does not have a newspaper, or phone book and telephone for guidance. This is particularly true if the decision to attend a movie is made spontaneously, perhaps when one is already away from home.

Thus, there is a further need for a means of communicating movie theater locations, movies being shown and show times to interested members of the public. There is also a need to be able to request and obtain such information from any location without the need to locate a newspaper, telephone or theater phone number.

SUMMARY OF THE INVENTION

It is an object of the present invention to meet the above identified needs and others. Particularly, it is an object of the present invention to provide a pager technology in which a pager user can use a pager to query a service provider for movie and ticket information for the general area where the pager user is located.

It is a further object of the invention to provide a pager system in which the general location of a pager user is determined in order to provide movie and ticket information appropriate to the user's location.

It is a further object of the invention to provide a pager system with which a pager user may purchase advanced tickets for a movie.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may comprise a pager having: a display; means for transmitting a request for movie information to a paging system; means for receiving movie information transmitted by the paging system; means for inputting movie selection information based on the movie information; and means for transmitting the movie selection information to the paging system.

The movie information may comprise theater location, a list of movies being shown; and a listing of show times associated with the list of movies being shown. The movie selection information may comprise a movie a pager user wishes to see, a show time for that movie when the pager user wishes to see the move, and a number of tickets the pager user desires to purchase.

The means for transmitting the request for movie information may comprise an icon displayed on the display and means for selecting the icon. The request for movie information is transmitted in response to the selection of the icon.

The present invention may also comprise a paging system having: at least one radio signal receiving base station for receiving radio signals from the pager; at least one radio signal transmitting base station for transmitting radio signals to the pager; means for identifying the request for movie information transmitted by the pager; means for compiling movie information; means for transmitting the movie information to the pager; means for identifying the general location of the pager and means for compiling movie information appropriate to the determined location of the pager; means for receiving movie selection information from the pager; and means for arranging for the purchase of tickets to a movie represented by the movie selection information transmitted from the pager.

The present invention may also include a method of using a pager to obtain movie information comprising the steps of: transmitting a request for movie information to a paging system with the pager; receiving movie information transmitted by a paging system; displaying the movie information on a display of the pager. The step of transmitting a request may comprise: displaying an icon on the display; selecting the icon; and transmitting the request in response to the selection of the icon.

The method of using a pager according to the present invention may also comprise the steps of: inputting movie selection information in response to the transmitted movie information; and transmitting the movie selection information to the paging system.

The method of the present invention may also include the steps of: providing a paging system having at least one radio signal receiving base station for receiving radio signals from the pager and at least one radio signal transmitting base station for transmitting radio signals to the pager; identifying with the paging system the request for movie information transmitted by the pager; identifying the general location of the pager with the paging system; compiling the movie information which may be only that information appropriate to the pager's location; transmitting the movie information to the pager with the paging system; receiving movie selection information from the pager with the paging system; and arranging for the purchase of tickets to a movie represented by the movie selection information transmitted from the pager.

BRIEF DESCRIPTION OF THE DRAWINGS

The accompanying drawings illustrate the present invention and are a part of the specification. Together with the following description, the drawings demonstrate and explain the principles of the present invention. In the drawings:

FIG. 4 is a diagram of the components of the pager and paging system according to the present invention.

DETAILED DESCRIPTION OF THE PREFERRED EMBODIMENT

Figure 1:
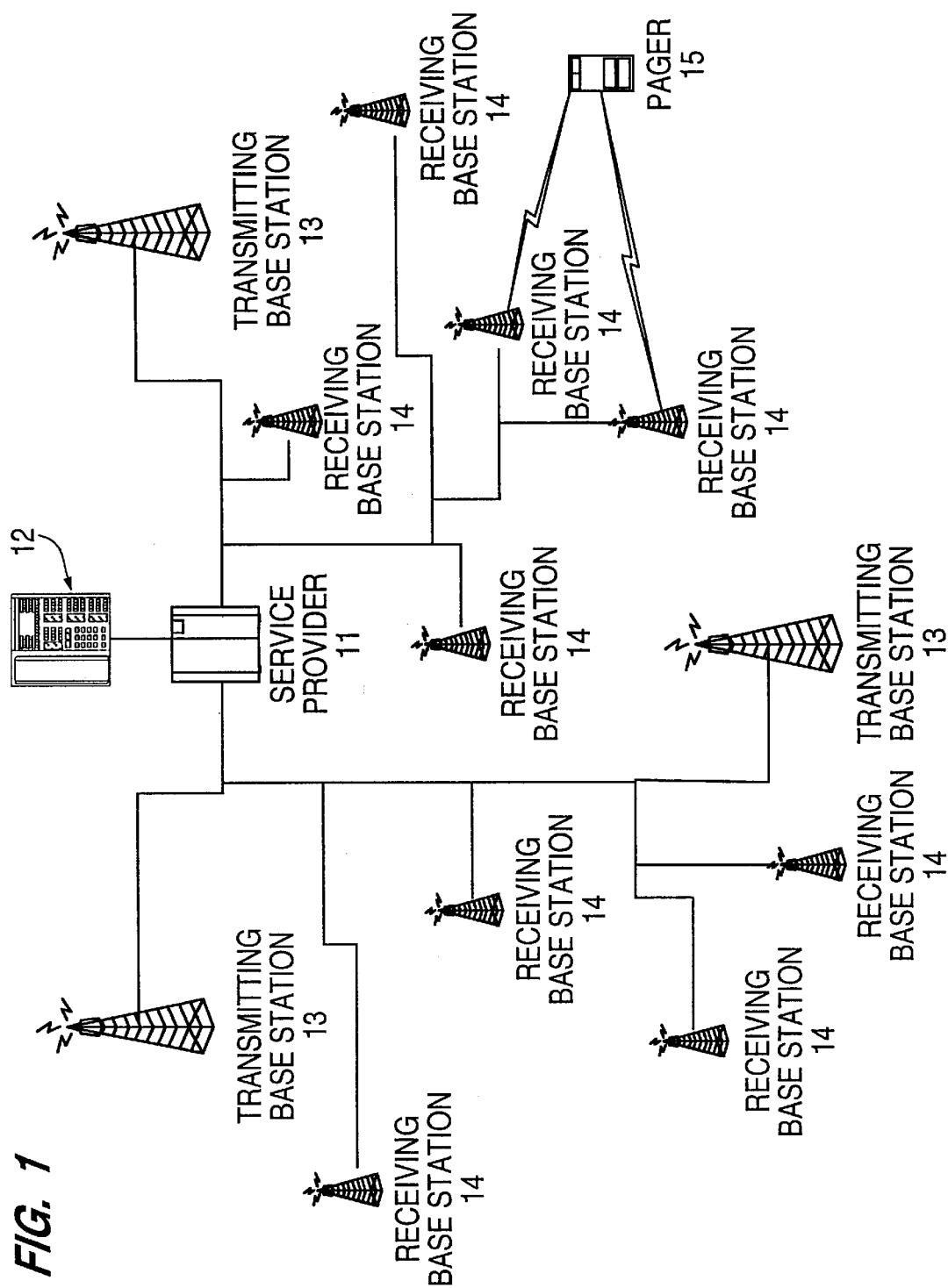
FIG. 1 is a schematic diagram of a conventional two-way paging network with which the present invention may be practiced.

Using the drawings, the preferred embodiment of the present invention will now be explained.

As described, a pager on a two-way paging system has the capability to transmit messages to the system. According to the principles of the present invention, when a pager user is interested in seeing a movie, he or she uses a pager to send a request to a service provider for movie information. The service provider may charge the pager user an additional fee under the service contract for this service.

The user's pager may have a dedicated button which, when pushed, sends a request for movie information to the service provider. However, in the preferred embodiment, illustrated in FIG. 2, the user's pager 21 includes a liquid crystal display 24. On the display 24, the user will find an icon 25 which, when selected, sends the request to the service provider for movie information.

To select the icon, the pager is provided with buttons 23 for moving a cursor on display 24. When the cursor is highlighting the icon 25, the user pushes the select button 22. The user's pager may be programmed with this feature by the service provider when the contract between the service provider and the pager user is set up and the pager user indicates a desire for the movie information service.

In the preferred embodiment, after the request for movie information is sent, the service provider's system may determine the general location of the pager user. With reference to FIG. 1, the method of determining the general location of a pager 15 using a two-way paging network will be briefly described.

Because the strength of a transmission from a pager 15 is tightly constrained by the battery power available to the pager, a two-way paging system must include a greater number of receiving base stations 14 than transmitting base stations 13. The receiving base stations 14 are smaller and distributed more widely that transmitting base stations 13 in order to receive the relatively weak transmissions broadcast by individual pagers 15. The receiving base stations 14 must be sufficient in number and distribution to receive pager transmissions originating anywhere in the service area.

In a two-way paging system, a transmission from a pager 15 may be received by one or more receiving base stations 14. By determining which base station 14 is receiving the pager signal or, if more than one base station is receiving the pager signal, which base station is receiving the stronger signal, the general location of the pager 15 and, thus, the pager user can be determined. This is based on the generally true principle that the base station 14 receiving the strongest signal from the pager 15 is geographically closest to that pager.

As shown in FIG. 4, the service provider gathers movie information such as theater location, ticket prices, movie availability, movie ratings and show times. This information is compiled in a database 34 which is part of the paging system 10.

A central processing unit 35 of the paging system 10 will receive the request for movie information transmitted by pager 15. Having received the request, the central processing unit 35 can determine the general location of the pager 15 using the method described above. The central processing unit may then review the compiled movie information in database 34 to identify information specific to the pager's determined location.

The pager 15 is provided with an antenna 32 with which to transmit requests to and receive transmissions from the paging system 10. Using antenna 32, the transmission of movie information from paging system 10 is received by a controller 31 of pager 15. The controller 31 drives display 24 to display the transmitted information for the pager user. The user may then scroll through the provided information on display 24 to determine where and when to see the movie of his or her choice.

If a relationship exists between the service provider and the movie theater or theaters, the principles of the present invention allow a user to not only view movie information, but also purchase advance tickets using the pager system.

Figure 2:
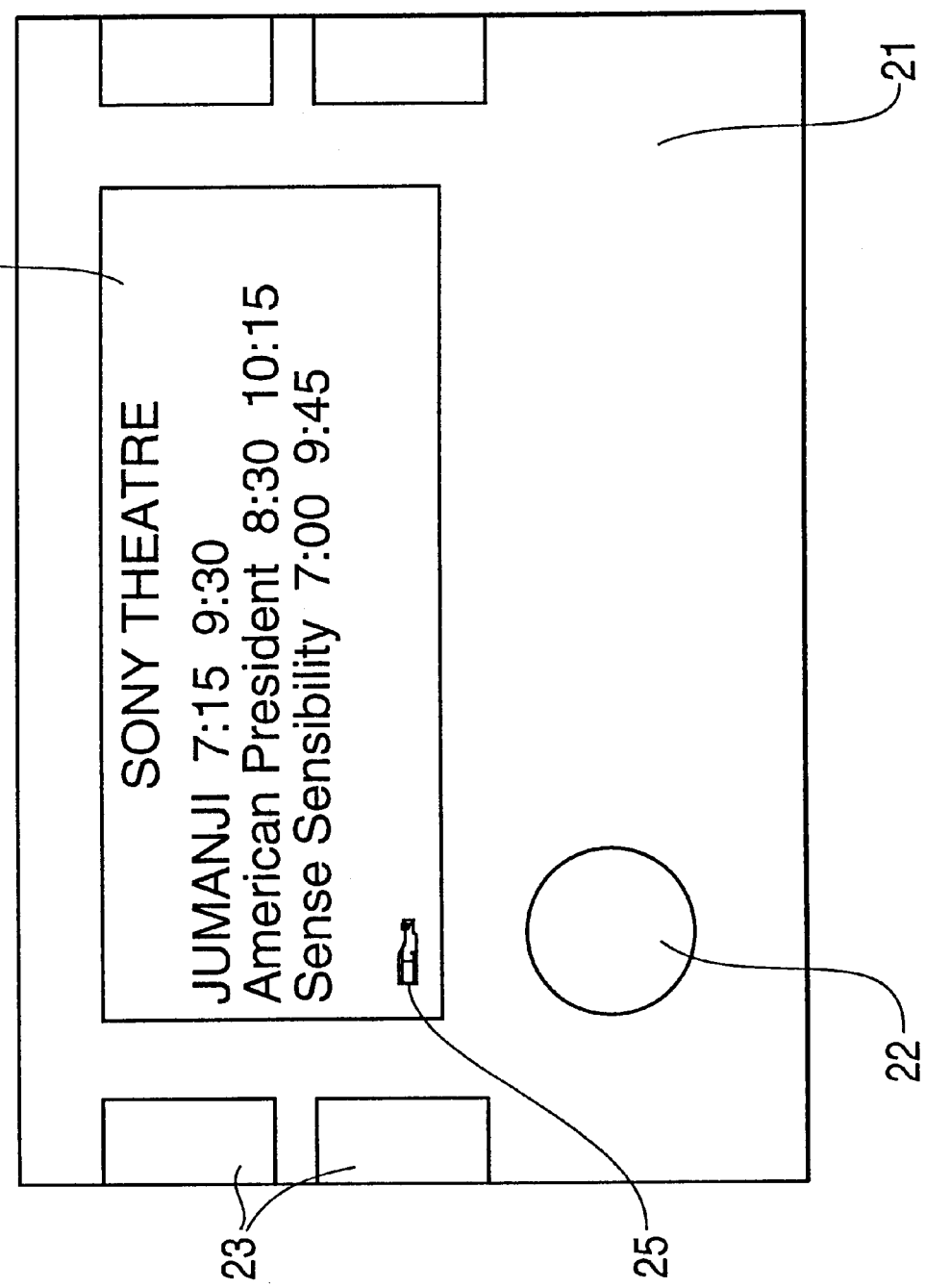
FIG. 2 is a diagram of a pager according to the principles of the present invention.
Figure 3:
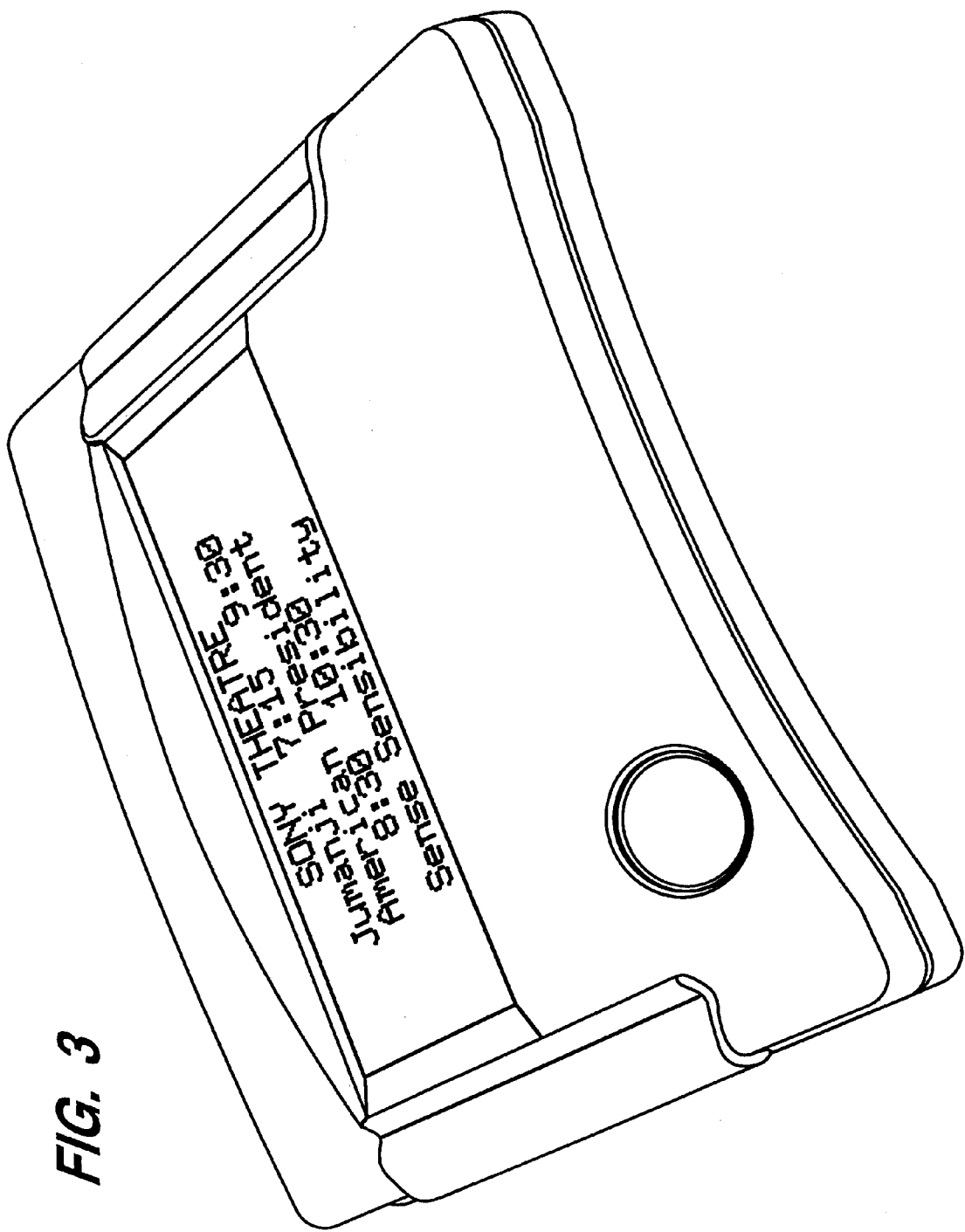
FIG. 3 illustrates a preferred design for a pager according to the present invention.

As shown in FIG. 2, the user may scroll through a list of movie titles and show times transmitted by the service provider. According to the principles of the present invention, the user may highlight and select the show time listed for the movie of his or her choice. The selection is made, as before, by using buttons 23 to move a cursor on the display 24 and button 22 to indicate a selection. The user would also indicate the number of tickets desired, for example, by highlighting and selecting a number from a displayed range of numbers.

The ticket purchase information is then transmitted by the pager to the service provider through the service provider's system as illustrated in FIG. 4. The service provider then arranges for the tickets to be purchased from the selected theater. When the user arrives at the theater for the show, the tickets will be held for the user, preferably under the user's name or pager ID number, at the theater's will call.

The user may pay for the tickets when picking them up, or may be billed for them by the pager service provider on behalf of the theater. If the theater wishes to encourage pager ticket purchases, it may provide a reserved seating area for those with tickets purchased via pager.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A pager and paging system comprising:
    a pager for transmitting a request for movie information to a paging system, and for receiving and displaying movie information transmitted by said paging system;
    a paging system comprising:
        a plurality of radio signal receiving base stations for receiving said request for movie information from said pager, wherein said plurality of base stations comprises a signal strength measuring device for determining which of said base stations receives most strongly a signal of said request for movie information from said pager;
        a processor with a database of movie information which sorts said movie information for movie information most relevant to a location of said base station which most strongly receives said signal of said request for movie information; and
        at least one radio signal transmitting base station for transmitting said relevant movie information to said pager;
    wherein said pager further comprises a data input device for inputting movie selection information based on said movie information which is then transmitted by said pager to said paging system;
    wherein said processor of said paging system further receives said movie selection information from said pager; and arranges for the purchase of tickets to a movie represented by said movie selection information transmitted from said pager.

2. A pager and paging system as claimed in claim 1, wherein said pager further comprises a data input device for inputting movie selection information based on said movie information which is then transmitted by said pager to said paging system.

3. A pager and paging system as claimed in claim 1, wherein said movie selection information includes a number of tickets to be purchased.

4. A method of using a pager to obtain movie information comprising the steps of:
    transmitting a request for movie information to a paging system with said pager;
    identifying a general location of said pager within said paging system;
    sorting a database of movie information for information most relevant to said general location of said pager;
    transmitting said relevant movie information to said pager with said paging system;
    receiving said relevant movie information transmitted by said paging system with said pager;
    displaying said relevant movie information on a display of said pager;
    inputting movie selection information in response to said receiving and displaying said relevant movie information;
    transmitting said movie selection information to said paging system;
    receiving said movie selection information from said pager with said paging system; and
    arranging for the purchase of tickets to a movie represented by said movie selection information transmitted from said pager.

5. A method as claimed in claim 4, wherein said movie information comprises theater location.

6. A method as claimed in claim 4, wherein said movie information comprises a list of movies being shown.

7. A method as claimed in claim 6, wherein said movie information comprises a listing of show times associated with said list of movies being shown.

8. A method as claimed in claim 4, wherein said step of transmitting a request comprises:
    displaying an icon on said display;
    selecting said icon; and
    transmitting said request in response to the selection of said icon.

9. A method as claimed in claim 4, wherein said step of transmitting a request for movie information further comprises:
    providing a pager;
    transmitting a request for movie information to a paging system with said pager;
    providing a paging system having at least one radio signal receiving base station for receiving radio signals from said pager and at least one radio signal transmitting base station for transmitting radio signals to said pager; and
    identifying with said paging system said request for movie information transmitted by said pager.

10. A method as claimed in claim 4, wherein said movie selection information includes a number of tickets to be purchased.

* * * * *